United States Patent [19]

Duran

[11] 4,030,715

[45] June 21, 1977

[54] PNEUMATIC SHOCK ABSORBER FOR SUSPENSION OF CARS AND/OR SIMILAR VEHICLES

[76] Inventor: Hector Oscar Duran, Moreto Street 678, Buenos Aires, Argentina

[22] Filed: July 9, 1975

[21] Appl. No.: 594,262

[30] Foreign Application Priority Data

Aug. 1, 1974  Argentina .......................... 255022

[52] U.S. Cl. .............................. 267/64 R; 188/317; 280/708; 280/714
[51] Int. Cl.² ........................................ B60G 11/26
[58] Field of Search ............... 280/124 F, 702, 708, 280/714; 267/64 R, 64 A, 64 B; 188/317, 322

[56] References Cited

UNITED STATES PATENTS

| 1,742,691 | 1/1930 | Chapman | 267/64 R |
|---|---|---|---|
| 1,877,543 | 9/1932 | Wendelstadt | 188/317 |
| 2,320,697 | 6/1943 | Binder | 188/322 |
| 2,336,137 | 12/1943 | Thornhill | 188/317 |
| 3,365,191 | 1/1968 | Ellis | 267/64 R |
| 3,381,780 | 5/1968 | Stachowiak | 267/64 R |
| 3,446,318 | 5/1969 | Duckett | 267/64 R |
| 3,525,512 | 8/1970 | Hagwood | 267/64 A |
| 3,843,107 | 10/1974 | Atkins | 267/64 R |
| 3,856,287 | 12/1974 | Freitag | 267/64 R |

Primary Examiner—Joseph F. Peters, Jr.
Assistant Examiner—John A. Carroll
Attorney, Agent, or Firm—Michael J. Striker

[57] ABSTRACT

A pneumatic shock absorber for use in a suspension has a cylinder and a piston with a piston stem mounted in the cylinder for reciprocation, the piston stem and the cylinder being connected to different relatively movable parts of the suspension. A communication is established between the two chambers which the piston separates in the housing, which communication is controlled so as to determine the rate of flow of the pneumatic medium therethrough and thus the extent and speed of reciprocation of the piston relative to the housing. A valve arrangement controls the pressure of the pneumatic medium in the interior of the housing.

8 Claims, 2 Drawing Figures

PNEUMATIC SHOCK ABSORBER FOR SUSPENSION OF CARS AND/OR SIMILAR VEHICLES

BACKGROUND OF THE INVENTION

The present invention relates to a pneumatic shock absorber for suspension of cars and/or similar vehicles which, due to its functional and constructive characteristics is a new, original and practical solution resulting in a greater suspension smoothness instead of the hardness and vibrations which usually cannot be avoided with the use of known shock absorbers or telescopic hydraulic shock absorbers.

There are already known, for example, pneumatic shock absorbers with the cylinder divided, by means of a piston of one or its movable parts into two coaxial chambers which are essentially independent and contain respective air charges at desired pressure; thus, one chamber is in opposite position to the other chamber and a neutral brake point is determined by the compressibility of the air contained in the chambers.

SUMMARY OF THE INVENTION

Unlike aforementioned, this invention presents a shock absorber with two interconnected chambers which communication allows for equaization of the pressures in the chambers so that an automatically adjustable shock absorber brake is obtained as a result of the air passing from one chamber to the other in dependence on the compression and bounce of the vehicle's suspension. It is also possible to regulate the flow-through cross-sectional area of the communication existing between both chambers and, on the other hand, to provide an adjustable a maneuverable air inlet valve which, at the same time, may be used to increase or lessen the working pressure according to the need for a higher or lower hardness of the suspension. Another of the advantages of the shock absorber of the present invention is that is can be easily reparied due to the fact that it is made up of parts that can be easily replaced and due to the utilization of air as the braking medium which may be injected again in case of eventual losses.

According to the invention the shock absorber includes a cylinder provided with an air inlet valve under pressure and a threaded cover with a sealing gasket and retainer for a lubricant charge contained in the cover, as well as a stem passing through said cover and carrying a piston with an antifriction ring which is provided with air passages controlled by a valve arranged between said piston and a bushing separating a lubricant charge on said valve from an inlet of a communicating passage, through the piston rod adjustable by means of an interchangeable nozzle at the other end of said passage whch establishes connection between both coaxial chambers.

This shock absorber may be manufactured in various sizes, materials and forms, according to the purposes that are required.

So that this invention may be clearly understood, it will now be described in detail, referring to the drawings enclosed herewith.

DETAILED DESCRIPTION OF THE PREFERRED EMBODIMENTS

Figure 1:
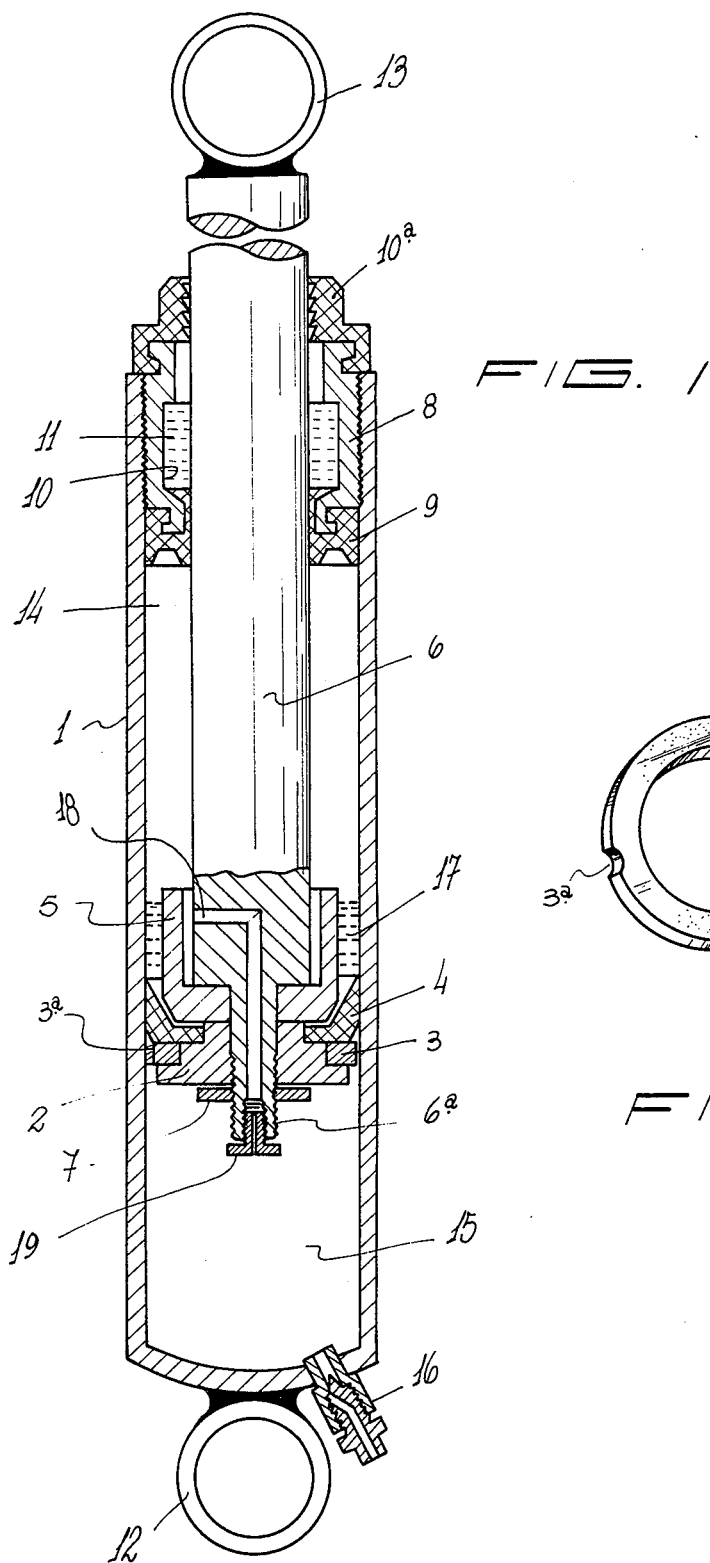
FIG. 1 represents a longitudinal cross section of the shock absorber of the pesent invention.
Figure 2:
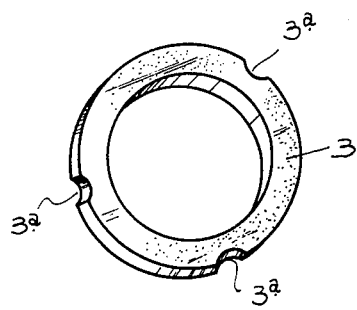
FIG. 2 is a perspective view of a friction ring used in the shock absorber of FIG. 1.

In both figures, the same reference numerals indicate similar parts.

As may be easily observed in the drawings, the pneumatic shock absorber of the invention includes a cylinder 1 and, inside it, a piston 2 on which there is mounted an anti-friction ring 3, with peripheral notches $3^a$ for air passage and a valve 4 which in this case is tightly retained between the piston 2 and a bushing 5 mounted on a spindle $6a$ of the stem 6 of the piston and retained by a nut 7 threaded on said spindle $6a$.

In its upper part as viewed in FIG. 1, the cylinder 1 is closed by a threaded cover 8, which is provided with an elastic packing or gasket and a concentric cavity 10 partly filled with a lubricant charge 11, that surrounds a portion of the piston stem 6 which passes through said cover 8, the cavity 10 being sealed by an elastic retainer $10^a$. Moreover, a ring forming part of the cylinder 1 and a ring 13 at the end of the piston stem 6, constitute the attachment means of the shock absorber.

Thus, the piston 2 internally divides the cylinder 1 into two coaxial chambers: an upper chamber 14 and the a lower chamber 15 which may be supplied with pressure air through an adjustable needle valve 16 arranged, at the bottom of the cylinder 1 and which may be closed or opened at will and opening.

In the chamber 14, the bushing 5 which has been already mentioned, acts as a separator for a lubricant 17 for sealing the piston 2. The bushing 5 prevents said lubricant 17 from penetrating into a passage 18 that connects, through the piston stem 6 and the spindle $6a$, both chambers 14 and 15 with each other.

The passage 18, is provided at its end communicating with the chamber 15 with an interchangeable nozzle 19, which is thread into to the spindle $6a$ as a means for regulating the passage of air from the chamber 14 towards the chamber 15.

The operation of the shock absorber is the as follows: Considering the shock absorber filled with an air charge injected through the needle valve 16 and within the presure value which is suitable for operation and, starting with the same pressure in both chambers 14 and 15 and prior to the compression of the vehicle suspension, when the piston 2 is lowered it causes the air contained in the chamber 5 to flow towards the chamber 14 through the notches $3^a$ of the antifriction ring 3 which result in opening of the valve 4; in said chamber 14, where the volume of the piston stem 6 reduces the capacity of the chamber, an incremental increase in pressure takes place which, prior to the return of the suspension and the rise of the piston 2, closes the valve 4. On return of the suspension, air returns towards the chamber 15 through the passage and the nozzle 19 the flow through cross-sectional area of which determines the desired braking power. From the aforementioned it may be seen that the selection of both the volume of the piston stem 6 and the flow-through cross-sectional area of the nozzle 19, determine said braking power which, on the other hand, is correlated to the operation of the other elements of the suspension. Moreover, it must be considered that the extent and the number of oscillations of the suspension springs absorber by the shock absorber will be proportionate to the braking power of the shock absorber.

It must be understood that the present invention is not limited to the example described herein but that various modifications as regards shape and/or details are intended to be included, which may be covered within the scope of this invention as claimed in the appended claims.

What is claimed is:

1. A pneumatic shock absorber for use in a suspension comprising, in combination, an elongated housing having a longitudinal axis and an internal surface bounding an enclosed space for a gaseous medium; a piston accommodated in said space for reciprocation axially of said housing and subdividing said space into two chambers, said piston having a peripheral surface juxtaposed with said internal surface of said housing; a piston stem connected to said piston and passing through one of said chambers and through said housing coaxially therewith to the exterior of said housing; means for so connecting said housing and said piston stem, respectively, to different relatively movable parts of the suspension that said longitudinal axis of said housing is upright and said one chamber is situated upwardly of said piston; means for communicating said chambers with one another, including an interspace bounded by said peripheral surface of said piston and said internal surface of said housing, and a passage provided in said piston stem and having a port which communicates said passage with said one chamber upwardly of said piston; means for controlling the cross-sectional area of said communicating means to thereby determine the rate of flow of the gaseous medium therethrough between said chambers and thus to control the extent and speed of reciprocation of said piston axially of said housing, including a sealing ring mounted on said piston intermediate said interspace and said one chamber and having a deflectable portion which sealingly contacts said internal surface and said housing when the pressure in said one chamber exceeds that in the other chamber and which is deflected out of contact with said internal surfaces of said housing when the pressure in said other chamber exceeds that in said one chamber, and a body of liquid lubricant which constitutes a liquid seal in said one chamber on said sealing ring and has an upper level, said sealing ring and said liquid seal permitting flow of the gaseous medium through said interspace in direction from said other into said one chamber but preventing such flow in the opposite direction; and means for separating said liquid seal from said port and thus from said passage to thereby prevent said liquid lubricant from escaping from said one into said other chamber through said passage, including a cup-shaped member connected to said piston for reciprocation therewith and extending upwardly therefrom beyond said upper level of said liquid seal and surrounding a compartment in said one chamber which is filled with the gaseous medium and with which said port communicates, whereby said liquid seal is confined between said cup-shaped and said internal surface of said housing.

2. A combination as defined in claim 1, wherein said housing includes a substantially cylindrical member having a closed end and an open end longitudinally spaced from said closed end, and a cover for closing said open end, mounted on said cylindrical member and having a central opening for passage of said piston stem therethrough, said cover accommodating a sealing arrangement for sealing said piston stem in said central opening.

3. A combination as defined in claim 2, wherein said sealing arrangement includes a sealing gasket in said cover coaxially surrounding said piston stem, and a body of a lubricating fluid in said cover, said sealing gasket separating said body from said one chamber so as to prevent escape of said lubricating fluid into the latter.

4. A combination as defined in claim 1, wherein said control means includes a nozzle interchangeably accommodated in said passage and having a flowthrough cross-sectional area detrminative of the rate of flow of said gaseous medium through said passage from said one chamber to the other chamber, and vice versa.

5. A combination as defined in claim 1, wherein said communicating means includes an antifriction ring mounted on said piston and provided with peripheral notches communicating said other chamber with a region of said interspace immdeiately surrounding said piston.

6. A combination as defined in claim 1; and further including valve means communicating with said enclosed space and operative for controlling the pressure of said gaseous medium therein.

7. A combination as defined in claim 6, wherein said valve means includes a valve body communicating with a source of pressurized gaseous medium; a valve member mounted in said valve body for displacement between an open position and a closed position, and means for displacing said valve member relative to said valve body so as to selectively open and close said valve means.

8. A combination as defined in claim 6, wherein said valve means is a needle valve.

* * * * *